United States Patent
Catalano et al.

[11] Patent Number: 5,449,153
[45] Date of Patent: Sep. 12, 1995

[54] ISOLATION MOUNTING PLATE FOR BLOWER MOTOR

[75] Inventors: Patricia M. Catalano, Albion, N.Y.; Timothy Dudek, Lexington, Ky.

[73] Assignee: Cadillac Rubber & Plastics, Inc., Cadillac, Mich.

[21] Appl. No.: 166,571

[22] Filed: Dec. 13, 1993

[51] Int. Cl.$^6$ .............................................. A47F 5/12
[52] U.S. Cl. .............. 267/141.4; 267/141.2; 267/141.5
[58] Field of Search .............. 267/141, 140.11, 141.2, 267/141.4, 141.5, 153, 141.3; 248/632, 634–638, 604, 612, 672, 603, 605, 659, 666; 180/300, 312

[56] References Cited

U.S. PATENT DOCUMENTS

| | | | |
|---|---|---|---|
| 1,445,617 | 2/1923 | Jehu | 248/635 |
| 2,510,680 | 6/1950 | Byrnes | 248/672 |
| 3,350,042 | 10/1967 | Stewart | 267/141.4 |
| 4,306,708 | 12/1981 | Gassaway et al. | 267/141.3 |
| 4,452,417 | 6/1984 | Krafthefer et al. | 248/604 |
| 4,520,987 | 6/1985 | Eguchi et al. | 248/635 |
| 4,522,378 | 6/1985 | Nelson | 267/141.4 |
| 4,606,238 | 8/1986 | Ikemoto et al. | 74/473 R |
| 5,121,905 | 6/1992 | Mann | 267/141.4 |
| 5,131,619 | 7/1992 | Daugherty et al. | 248/635 |
| 5,251,865 | 10/1993 | Kelly | 267/141.5 |
| 5,335,893 | 8/1994 | Opp | 248/632 |

FOREIGN PATENT DOCUMENTS

458248A 11/1991 European Pat. Off. ............ 248/672

*Primary Examiner*—Robert J. Oberleitner
*Assistant Examiner*—Clifford T. Bartz
*Attorney, Agent, or Firm*—Varnum, Riddering, Schmidt & Howlett

[57] ABSTRACT

A mounting plate assembly for use in isolating vibration between a motor and a support member is disclosed. A motor is securely mounted to the mounting plate. The mounting plate has a plurality of openings in the outer portion of the plate to receive fasteners for mounting the mounting plate to a support member. An elastomeric gasket is molded to the mounting plate and encompasses the openings about the outer perimeter in the mounting plate. The gasket has bosses formed therein which extend through the openings in the mounting plate. The bosses have, at the openings in the mounting plate, an external diameter which is substantially less than the openings in the mounting plate at least in one direction perpendicular to the axis of the opening. Preferably, the openings in the mounting plate are elongated in a direction tangential to an axis of rotation of the motor drive shaft so that the motor can articulate in a rotational direction with respect to the support member.

19 Claims, 6 Drawing Sheets

ISOLATION MOUNTING PLATE FOR BLOWER MOTOR

BACKGROUND OF THE INVENTION

1. Field of the Invention

This invention relates to a mounting plate for a motor and, more particularly, to a mounting plate with an elastomeric gasket to isolate vibration of a blower motor from the motor support housing.

2. Description of the Related Art

Motors which provide a force of rotation to a drive shaft generate a certain amount of vibration as a result of the rotation of the drive shaft. The level of vibration, especially during starting and stopping, increases for electric motors in light of the combined vibration caused by the rotating armature and the rotating drive shaft.

It is desireable in many applications of motors having rotating drive shafts to dampen or isolate the vibration generated by the motor from the member supporting the motor. For example, passenger automobiles typically mount an electric blower motor in the passenger compartment of the automobile to circulate heated air for the heater and cool air for the air conditioning system. The motor has rotating armatures which provide the force of rotation for a drive shaft to which a fan is mounted for circulating the temperature controlled air. Because the motor is mounted in the passenger compartment, it is desireable to isolate the vibration generated by the motor from the member which supports the motor.

Several vibration isolating mounts and grommets are known which dampen vibration between two members. For example, one known motor dampening structure comprises a motor mounting plate having a central opening formed therein for receiving the motor drive shaft, fasteners to mount the motor to the plate and a plurality of U-shaped slots formed on the perimeter of the plate and adapted to receive elastomeric grommets. The grommets receive fasteners which mount the motor and mounting plate to a support member and dampen vibration generated by the motor.

Other examples of isolating mounting assemblies are seen in U.S. Pat. No. 5,131,619 issued Jul. 21, 1992 to Daugherty et al.; U.S. Pat. No. 4,522,378 issued Jun. 11, 1985 to Nelson; U.S. Pat. No. 4,520,987 issued Jun. 4, 1985 to Eguchi et al.; U.S. Pat. No. 4,306,708 issued Dec. 22, 1981 to Gassaway et al.; and U.S. Pat. No. 1,445,617 issued Feb. 13, 1923 to Jehu. Each of these prior art references suffer from the deficiency of adequately and effectively isolating the rotational force generated by the motor from the supporting member, especially during the starting and stopping of the motor.

SUMMARY OF THE INVENTION

The isolation mounting plate for a motor according to the invention overcomes the problems of the prior art by effectively isolating and shielding the support member from the vibration and rotational forces generated by the motor, especially during the initial start and stop of the rotation of the motor.

In the preferred embodiment, the motor mounting plate assembly according to the invention comprises a mounting plate having a central opening for receiving the drive shaft of a motor and apertures for receiving fasteners of the motor. Openings are formed in the outer portion of the plate to receive fasteners for mounting the mounting plate to a support. An elastomeric gasket is molded to the mounting plate and encompasses the openings in the mounting plate. The gasket has formed therein bosses which extend through the openings in the mounting plate. The bosses have, at the openings in the mounting plate, an external diameter which is substantially less than the openings in the mounting plate, at least in one direction perpendicular to the axis of the opening. The vibration generated by the motor is isolated from the support through the elastomeric gasket and the motor is movable with respect to the support at least in the one direction.

Preferably, the openings in the outer portion of the plate are elongated in a direction tangential to an axis of rotation of the motor drive shaft so that the motor can articulate in a rotational direction with respect to the support.

Preferably, the bosses are substantially cylindrical and are formed of thickened portions of elastomeric material.

In yet another embodiment, three openings are formed in the outer portion of the plate to receive the fasteners of the elastomeric gasket. Preferably, the three openings are spaced about the perimeter of the mounting plate approximately 120° from each other.

In another embodiment, the invention comprises a motor assembly comprising a motor having a drive shaft and a plurality of fasteners for mounting the motor to a mounting plate. The mounting plate comprises apertures for receiving fasteners of the motor, openings in the outer portion of the plate to receive fasteners for mounting the mounting plate to a support housing and an elastomeric gasket molded to the mounting plate. The gasket encompasses the openings in the mounting plate and has formed therein bosses which extend through the openings in the mounting plate. The bosses have, at the openings in the mounting plate, an external diameter which is substantially less than the openings in the mounting plate at least in one direction perpendicular to the axis of the opening. A support housing comprises a plurality of fasteners adapted to be received in the openings of the mounting plate and securely mount the mounting plate thereto. Vibration generated by the motor is isolated from the support housing through the elastomeric gasket and the motor is movable with respect to the support housing at least in the one direction.

BRIEF DESCRIPTION OF THE DRAWINGS

The invention will now be described with reference to the drawings wherein.

DESCRIPTION OF THE PREFERRED EMBODIMENTS

Figure 1:
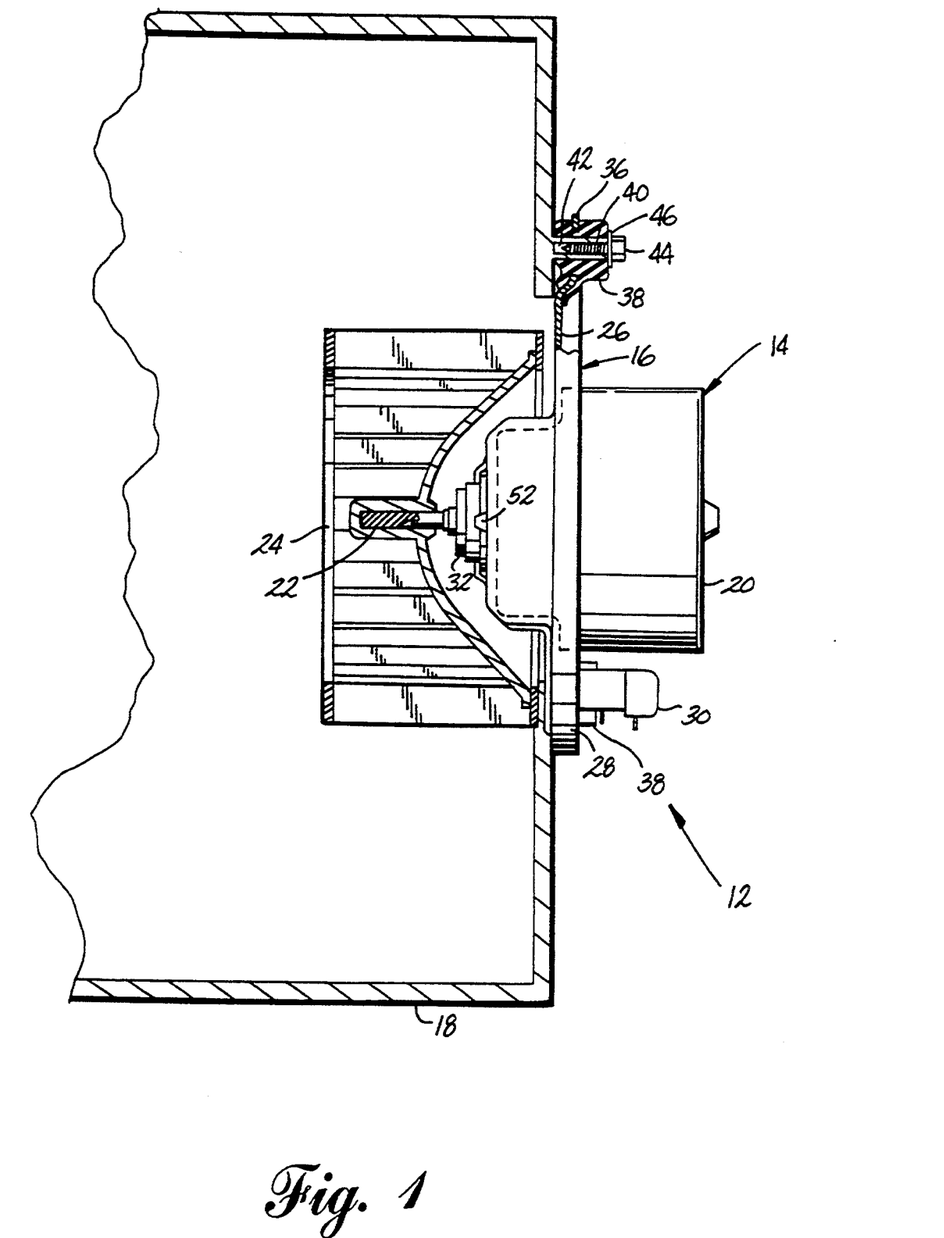
FIG. 1 is a partial sectional view of an electric blower motor and mounting plate assembly mounted to a support housing according to the invention.

Referring now to the drawings and to FIG. 1 in particular, a motor assembly 12 comprises an electric motor 14 securely mounted to an isolator mounting plate 16 which is in turn mounted to a support member or fan housing 18. The motor 14 comprises a motor body 20 and a drive shaft 22 extending outwardly therefrom. A fan member 24 is securely mounted to the drive shaft and adapted to rotate therewith.

The isolator mounting plate 16 comprises a rigid plate 26 having a top surface 34 (FIG. 2), a bottom surface 35 (FIG. 3) and an elastomeric gasket 28 which is integrally molded on the outside perimeter of the rigid plate 26. A plurality of support fastener openings 36 are formed in the outer portion of the rigid plate 26. Thickened bosses 38 which comprise a portion of the elastomeric gasket 28 extend through and encompass the support fastener openings of the rigid plate 26.

An electrical connector 30 is securely mounted to the rigid plate 26 and is electrically connected to the motor 14 through conventional electrical conduits (not shown). The electrical connector 30 is adapted to join a second electrical connector (not shown) to supply electrical current to the electric motor 14 for operation thereof.

The rigid plate 26 also has a plurality of anchor openings 62 formed in the outer perimeter thereof. The diameter of the anchor openings 62, is relatively small in comparison to the support fastener openings 36. When the elastomeric gasket 28 is molded on the rigid plate 26, the fluid elastomeric material passes through and solidifies in the anchor opening 62 thereby interconnecting the elastomeric material extending along the top surface 34 and the bottom surface 35 of the rigid plate 26.

Figure 8:
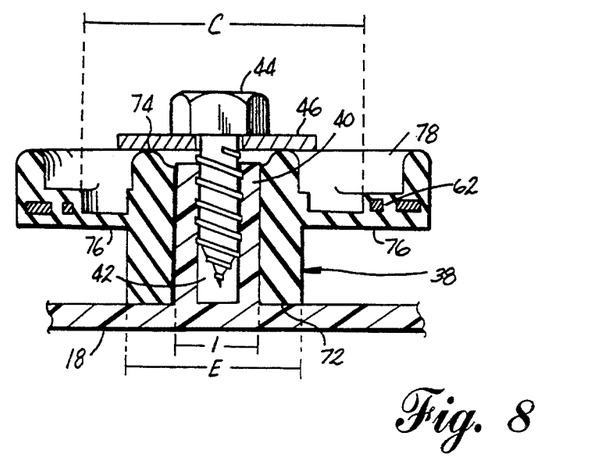
FIG. 8 is a partial sectional view of the mounting bosses of the isolator gasket taken along lines 8—8 of FIG. 2.

As seen in FIGS. 1 and 8, the bosses 38 are adapted to receive rigid support members 40 extending outwardly from and integrally molded to the fan housing 18. The outside diameter of the rigid support members 40 closely approximates the inside diameter of the opening of the bosses 38 such that the rigid support member 40 is snugly received within the opening of the bosses 38. The rigid support member 40 has formed therein an axial opening 42 which is adapted to receive a suitable fastener such as a self-tapping screw 44. A washer 46 is mounted on the screw such that the washer 46 engages the top surface 74 of the boss 38 while the bottom surface 72 of the boss 38 engages the fan housing 18.

As seen in FIGS. 2-5, the isolator mounting plate 16 is a substantially circular plate comprising a drive shaft opening 50 formed in the central portion of the rigid plate 26 and a plurality of bearing retaining tabs 52 formed immediately adjacent the drive shaft opening 50. Conventional bearings 32 (FIG. 1) are mounted in the drive shaft opening 50 and the bearing retaining tabs 52 are deformed to securely mount the bearings in the drive shaft opening 50. A plurality of openings are formed in the rigid plate 26 and adapted to receive fasteners extending from the electric motor 14. Preferably, the openings comprise a pair of elongated motor fastener openings 54 and a pair of circular motor fastener openings 56. Conventional fasteners such as screws extend through the openings 54, 56 to securely mount the motor 14 to the rigid plate 26.

A contoured electrical connector recess 58 is formed in one portion of the rigid plate 26 and has a fastener opening 60 formed therein. A conventional fastener, such as a screw, extends through the fastener opening 60 to securely mount the electrical connector 30 within the electrical connector recess 58.

As noted above, support fastener openings 36 are formed adjacent the outer perimeter of the plate 26. Preferably, these openings 36 are elongated openings, the width of the opening in the radial direction, R, being less than the width of the opening C in a circumferential or tangential direction. In other words, the tangential direction is tangential to a circle having as its center an axis perpendicular to a plane defined by the driveshaft opening 50. Preferably, three support fastener openings 36 are formed in the outer perimeter of the plate 26 and the openings are equally spaced approximately 120° from each other. Preferably, the rigid plate comprises a steel plate which is stamped by a conventional stamping operation.

Figure 2:
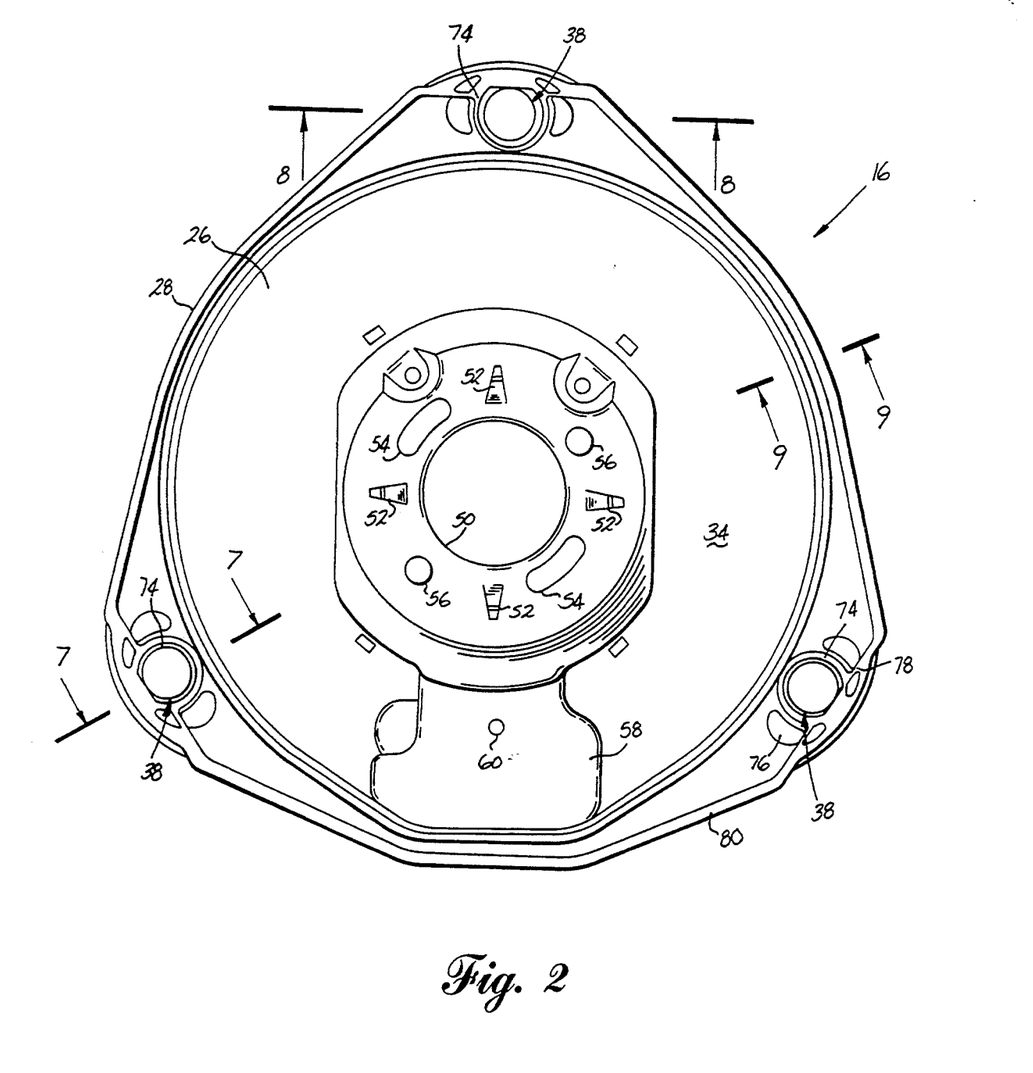
FIG. 2 is a top plan view of the isolation mounting plate and isolator gasket according to the invention.
Figure 3:
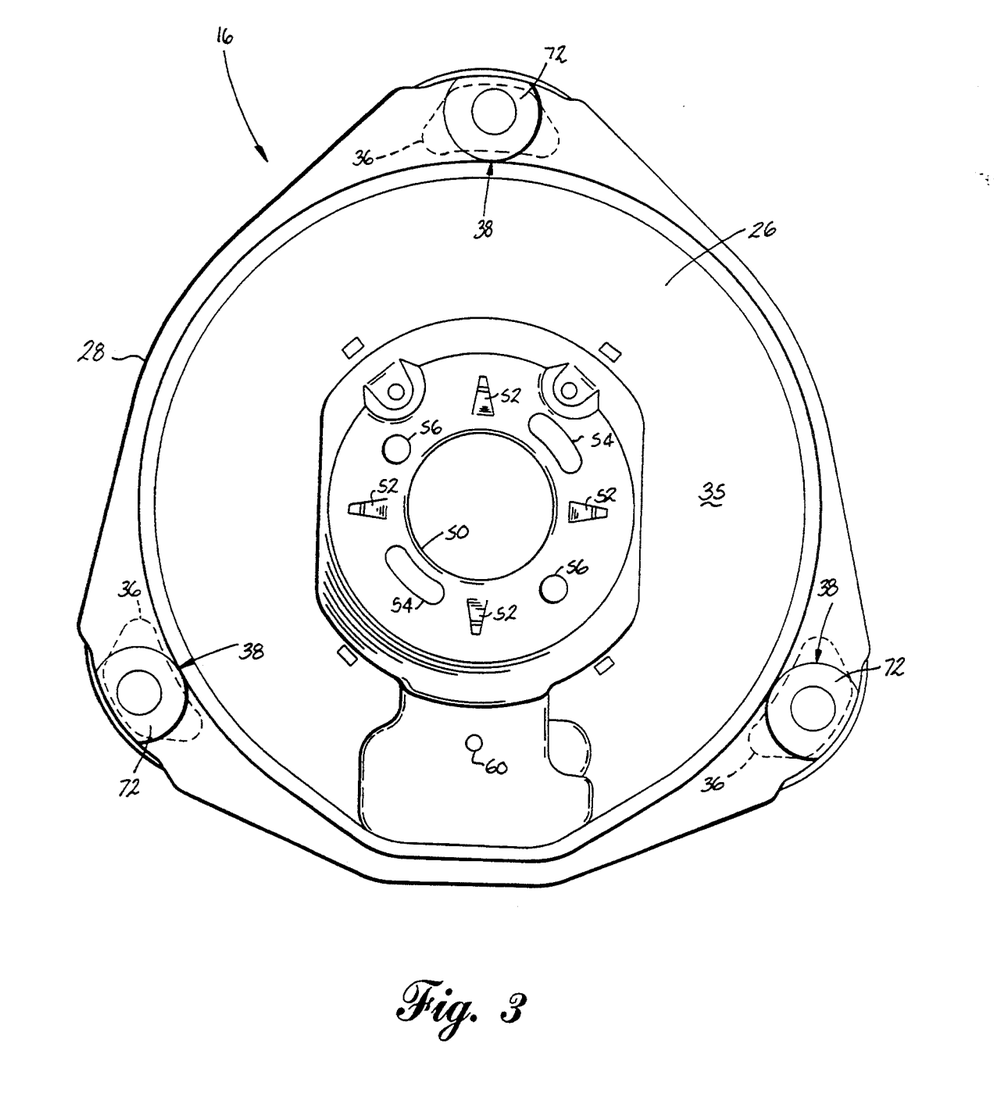
FIG. 3 is a bottom plan view of the isolation mounting plate and isolator gasket mounted thereto according to the invention.
Figure 4:
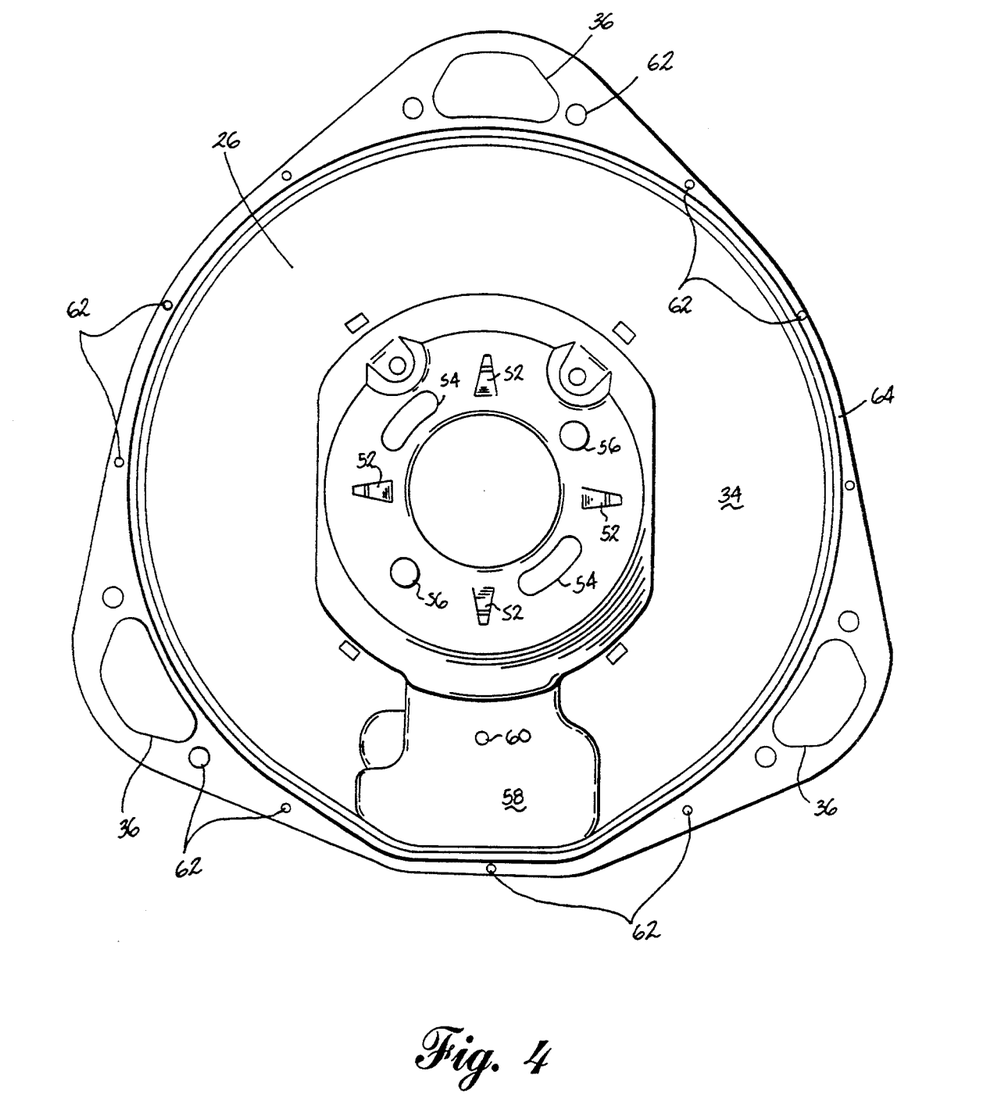
FIG. 4 is a top plan view of the isolator mounting plate prior to molding the isolator gasket thereon.
Figure 5:
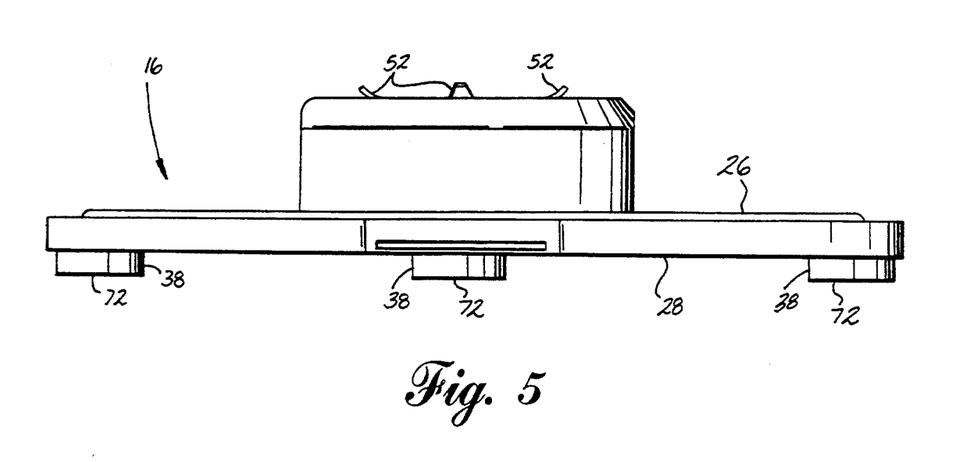
FIG. 5 is a side elevational view of the isolation mounting plate and isolator gasket according to the invention.
Figure 6:
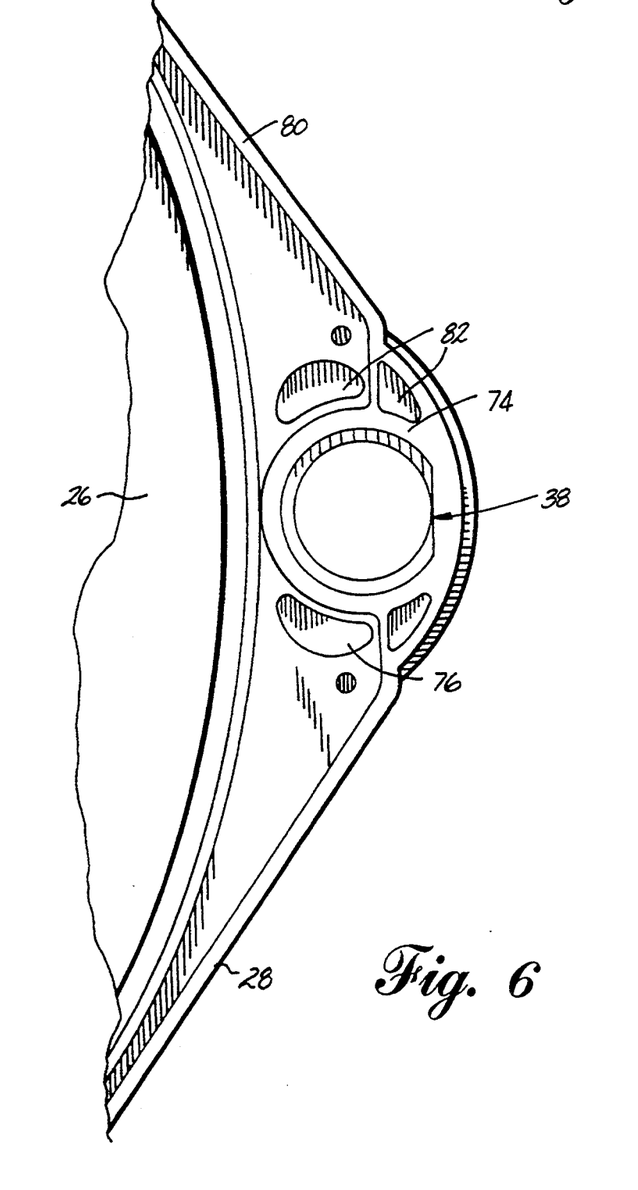
FIG. 6 is an enlarged partial top plan view of the isolation mounting plate showing in more detail the mounting bosses of the isolator gasket.
Figure 9:
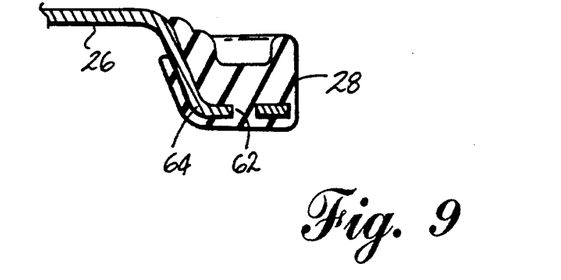
FIG. 9 is a partial sectional view of the outer perimeter flange and isolator gasket taken along lines 9—9 of FIG. 2.

As noted above, the elastomeric gasket 28 is integrally molded on the outer perimeter of the rigid plate 26 by a conventional molding operation. As seen in FIGS. 2 and 9, the elastomeric gasket 28 substantially surrounds an L-shaped flange 64 which extends around the outer perimeter of the rigid plate 26.

The elastomeric bosses 38 are integrally molded into the elongated support fastener openings 36 of the rigid plate 26. As seen in FIGS. 5-8, the bosses 38 are substantially circular in cross section and have an internal diameter I and an external diameter E. When the mounting plate is mounted to the support member or fan housing 18, the bottom surface 72 of the boss abuts the fan housing 18 and the top surface 74 of the boss abuts the washer 46 (FIG. 1).

In the preferred embodiment, the width of the support fastener opening 36 in the radial direction R is greater than the internal diameter I of the elastomeric boss 38 but less than the external diameter E of the boss 38. Therefore, a portion of the rigid plate 26 extends into the boss 38 in the radial direction. However, in the circumferential or tangential direction, the width of the elongated opening C is greater than the external diameter E and internal diameter I of the boss 38. A thin, flexible web 76 of elastomeric material extends from the boss 38 to the elastomeric material at the edge of the support fastener opening 36. In this preferred construction, the boss 38 floats in the web in the circumferential direction to allow greater articulation of the mounting plate in the circumferential direction with respect to the fan housing 18 than in the radial direction.

Preferably, an upstanding rib of elastomeric material 78 extends from the external diameter E of the boss 38 to the outside edge 80 of the elastomeric gasket 28. The rib 78 provides additional resistance to tangential articulation of the rigid support member 40 with respect to the mounting plate 16. A plurality of recesses 82 can be formed on one surface of the elastomeric gasket 28 depending upon the extremity of the tangential rotational forces to which the elastomeric gasket 28 will be subjected too.

Figure 7:
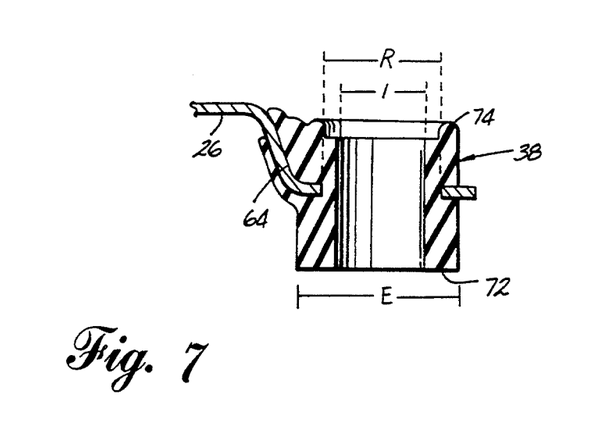
FIG. 7 is a partial sectional view of the mounting bosses of the isolator gasket taken along lines 7—7 of FIG. 2.

As seen in FIGS. 7 and 8, the direct contact between the rigid plate 26 and the rigid support members 40 of the fan housing 18 is prevented by the elastomeric material of the boss 38. Any vibration in the radial direction will be easily absorbed by the elastomeric boss. However, motors which drive a rotating shaft and particularly in electric motors which have the added rotational source of vibration of the rotating armatures, the amount of vibration in a direction tangential to the axis of rotation of the motor is significantly greater than in the radial direction. The isolator mounting plate 16 according to the invention is uniquely designed to absorb this enhanced vibration in the tangential direction in light of the structure of the support fastener openings 36 in relation to the elastomeric bosses 38 mounted therein. The reduced width of the support fastener opening 36 in the radial direction R in relation to the external diameter E of the boss 38 provides sufficient strength and support for the interconnection between the fan housing 18 and the mounting plate 16 whereas the expanded width of the elongated support fastener opening 36 in the tangential direction provides sufficient elastomeric material to absorb substantially all of the tangential vibration and articulation of the motor with respect to the fan housing 18.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments of the invention in which an exclusive property or privilege is claimed are defined as follows:

1. A motor mounting plate assembly comprising;
   a mounting plate having a central opening for receiving the drive shaft of a motor, apertures for receiving fasteners of the motor and support fastener openings in the outer portion of the plate to receive fasteners for mounting the mounting plate to a support; and
   an elastomeric gasket secured to the mounting plate and encompassing the support fastener openings in the mounting plate, the gasket having bosses formed therein and extending through the support fastener openings in the outer portion of the mounting plate, the bosses having, at the support fastener openings in the mounting plate, an external diameter which is substantially less than the diameter of the support fastener openings in the mounting plate at least in one direction perpendicular to an axis perpendicular to the support fastener opening;
   whereby the vibration generated by the motor is isolated from the support through the elastomeric gasket.

2. A mounting plate assembly according to claim 1 wherein the support fastener openings are elongated.

3. A mounting plate assembly according to claim 2 wherein the central opening of the mounting plate defines a plane which has an axis perpendicular thereto and wherein the support fastener openings are elongated in a direction tangential to a circle having the central opening axis at its center.

4. A mounting plate assembly according to claim 2 wherein the bosses are substantially cylindrical and are formed of thickened portions of elastomeric material.

5. A mounting plate assembly according to claim 4 wherein the gasket further comprises a web of material of reduced thickness extending between the bosses and an edge of the support fastener openings in the mounting plate.

6. A mounting plate assembly according to claim 5 wherein the elastomeric gasket further comprises at least one rib extending between the boss and an external lip of the elastomeric gasket.

7. A mounting plate assembly according to claim 1 wherein the central opening of the mounting plate defines a plane which has an axis perpendicular thereto and wherein the support fastener openings are elongated in a direction tangential to a circle having the central opening axis at its center.

8. A mounting plate assembly according to claim 1 wherein three support fastener openings are formed in the outer portion of the plate for receiving fasteners.

9. A mounting plate assembly according to claim 8 wherein the three support fastener openings are spaced about the perimeter of the mounting plate approximately 120° from each other.

10. A mounting plate assembly according to claim 1 wherein the elastomeric gasket substantially surrounds the mounting plate at a peripheral edge thereof.

11. A mounting plate assembly according to claim 1 and further comprising at least one anchor opening formed in the mounting plate, and wherein the elastomeric gasket surrounds the anchor opening and extends therethrough.

12. A motor assembly comprising;
    a motor comprising a drive shaft;
    a plurality of motor mounting fasteners for mounting the motor to a mounting plate;
    the mounting plate comprising;
       apertures receiving the motor mounting fasteners to mount the motor to the mounting plate;
       support fastener openings in the outer portion of the plate to receive fasteners for mounting the mounting plate to a support housing; and
       an elastomeric gasket secured to the mounting plate and encompassing the support fastener openings in the mounting plate, the gasket having bosses formed therein and extending through the support fastener openings in the mounting plate, the bosses having, at the support fastener openings in the mounting plate, an external diameter which is substantially less than the support fastener openings in the mounting plate at least in one direction perpendicular to an axis perpendicular to the support fastener opening; and
    a support housing comprising a plurality of fasteners received in the support fastener openings of the mounting plate to securely mount the mounting plate thereto;
    whereby, the vibration generated by the motor is isolated from the support housing through the elastomeric gasket and the motor is movable with respect to the support housing at least in the one direction.

13. A motor mounting plate assembly according to claim 12 wherein three support fastener openings are formed in the outer portion of the plate to receive the fasteners for mounting the mounting plate to the support housing and the three openings are spaced about the perimeter of the mounting plate approximately 120° from each other.

14. A motor assembly according to claim 12 wherein the mounting plate further comprises a central opening for receiving the drive shaft of the motor.

15. A motor assembly according to claim 12 wherein the support fastener openings are elongated.

16. A motor assembly according to claim 15 wherein the support fastener openings are elongated in a direction tangential to an axis of rotation of the motor drive shaft so that the motor can articulate in a rotational direction with respect to the support housing.

17. A motor assembly according to claim 16 wherein the bosses are substantially cylindrical and are formed of thickened portions of elastomeric material.

18. A motor assembly according to claim 12 wherein the support fasteners openings are elongated in a direction tangential to an axis of rotation of the motor drive shaft so that the motor can articulate in a rotational direction with respect to the support housing.

19. A motor assembly according to claim 18 wherein three support fastener openings are formed in the outer portion of the plate to receive the fasteners for mounting the mounting plate to the support housing.

* * * * *